( 12 ) United States Patent
Kanaoka

(10) Patent No.: US 8,544,853 B2
(45) Date of Patent: Oct. 1, 2013

(54) TWO-LEGGED WALKING TRANSPORTATION DEVICE

(75) Inventor: Katsuya Kanaoka, Shiga (JP)

(73) Assignee: Muscle Corporation, Osaka (JP)

( * ) Notice: Subject to any disclaimer, the term of this patent is extended or adjusted under 35 U.S.C. 154(b) by 0 days.

(21) Appl. No.: 13/138,518

(22) PCT Filed: Mar. 5, 2009

(86) PCT No.: PCT/JP2009/054192
§ 371 (c)(1),
(2), (4) Date: Nov. 18, 2011

(87) PCT Pub. No.: WO2010/100746
PCT Pub. Date: Sep. 10, 2010

(65) Prior Publication Data
US 2012/0068422 A1    Mar. 22, 2012

(51) Int. Cl.
B62B 5/02    (2006.01)
(52) U.S. Cl.
USPC ............... 280/1.181; 280/1.183; 280/1.184; 280/204; 180/8.1; 180/8.2; 180/8.4; 180/8.5
(58) Field of Classification Search
USPC ...... 280/1.181, 1.183, 1.184, 1.204; 180/8.1, 180/8.2, 8.4, 8.5
See application file for complete search history.

(56) References Cited

U.S. PATENT DOCUMENTS

| 8,267,876 | B2* | 9/2012 | Ashihara et al. | 601/34 |
| 8,292,836 | B2* | 10/2012 | Matsuoka et al. | 601/5 |
| 2004/0158175 | A1* | 8/2004 | Ikeuchi et al. | 601/5 |
| 2006/0270951 | A1* | 11/2006 | Ikeuchi | 601/5 |

FOREIGN PATENT DOCUMENTS

| JP | 7-256579 | 10/1995 |
| JP | 2007-319940 | 12/2007 |
| JP | 2008-253539 | 10/2008 |
| WO | WO-2009/060634 | 5/2009 |
| WO | WO-2009/128125 | 10/2009 |

OTHER PUBLICATIONS

Kazumichi Moriyama, Mezasu wa Jinki Ittai no Jitsuyo Machine-Ritsumeikan Daigaku * Katsuya Kanaoka. Chair Professor Interview, [online], Dec. 25, 2008, RobotWatch, [retrieval date Mar. 31, 2009], Internet<URL: http://robot.watch.impress.co.jp/cda/column/2008/12/25/1496.html>.

* cited by examiner

Primary Examiner — Tashiana Adams
Assistant Examiner — Marlon Arce
(74) Attorney, Agent, or Firm — Jordan and Hamburg LLP

(57) ABSTRACT

A two-legged walking transportation device includes an upper body unit for supporting the trunk of the rider, and leg units provided below the upper body unit, each of the leg units includes a link mechanism connected at one end to the upper body unit via a hip joint with at least three degrees of freedom, a foot mechanism connected to the other end of the link mechanism via an ankle joint with at least two degrees of freedom, and a fixing mechanism for fixing the rider's foot to the link mechanism via a multi-axis force sensor so as to be only rotatable with respect to directions in which the ankle joint is movable, the hip join is voluntarily controlled in accordance with operating force and/or operating torque provided by the rider's foot and sensed by the multi-axis force sensor, and control of the ankle joint while standing is automatically performed as balance maintenance control without directly involving the rider.

4 Claims, 6 Drawing Sheets

TWO-LEGGED WALKING TRANSPORTATION DEVICE

BACKGROUND OF THE INVENTION

The present invention relates to a two-legged walking transportation device for a person to ride on and thereby walk.

Conventionally, there are riding-style two-legged walking transportation devices, one example of which is described in Patent Document 1. As shown in FIG. 7, the two-legged walking transportation device 100 includes an upper body unit 101 provided with a seat on which a person (hereinafter, a "rider") rides, and a pair of right and left leg units 102R and 102L for supporting the upper body unit 101. Each of the leg units 102R and 102L includes a thigh link 106 connected to the upper body unit 101 via a hip joint 103 with three degrees of freedom, a lower leg link 107 connected to the end of the thigh link 106 via a knee joint 104 with a single degree of freedom, a plate-like foot portion 108 connected to the end of the lower leg link 107 via an ankle joint 105 with two degrees of freedom, and a foot rest 109 fixed slightly above the ankle joint 105.

The rider rides on the two-legged walking transportation device 100 by sitting on the seat of the upper body unit 101 with the feet on the foot rests 109. In addition, upon riding, the rider has his/her thighs, knees, and lower legs free (unbound), as shown in FIG. 7.

Accordingly, the two-legged walking transportation device 100 can omit adjustments of knee joint positions to be made in accordance with the rider's body shape. In addition, the two-legged walking transportation device 100 keeps the rider's barycentric position low, making it possible to readily control balancing and, if it falls, alleviate the impact on the rider.

Patent Document 1: Japanese Laid-Open Patent Publication No. 2007-319940

Incidentally, in general, to achieve two-legged walking, two functions, "gait generation" and "balance maintenance", are important. Here, the gait generation function is a function for planning a route from the current position to a destination and movement of the right and left legs or feet to walk along the route. The balance maintenance function is a function for preventing falling during a halt or two-legged walk.

Of the two functions, the balance maintenance function can be relatively readily achieved based on information from sensors or suchlike disposed on the soles (treads) of the two-legged walking transportation device.

However, to realize the gait generation function, high judgment ability is required in terms of, for example, understanding of the purpose of gait and comprehension of environmental information, and therefore it is difficult for the current technology to enable the realization. For example, in the case where there is unknown irregular ground to walk on or there are unknown obstacles on the way to the destination, it is necessary to consider, for example, whether such a case could hinder walking or whether or not to bypass the route, and if so, which route should be taken, and therefore it is extremely difficult for a computer to make accurate and quick judgments. Moreover, to obtain information to be the basis for the judgments, a number of high-precision sensors are required, and therefore at present, no realistic solution is available.

In relation to this, the conventional two-legged walking transportation device 100 shown in FIG. 7 is a mechanism on the premise that both the gait generation function and the balance maintenance function are realized under automatic control of a computer, and therefore it is difficult for the two-legged walking transportation device 100 to robustly walk with two legs in an unknown environment (e.g., irregular ground).

Furthermore, conventionally, there are two-legged walking transportation devices of the type that includes a means for the rider to provide some instruction, such as a joystick. The means of instruction allows the rider to provide a trigger to take the next step or an instruction to take a simple action such as moving forward/backward or circling, within the range of a previously created gait plan. However, for the two-legged walking transportation devices of this type also, the rider cannot provide instructions to take complicated actions, such as walking on irregular ground while successfully avoiding or tramping on obstacles by adjusting fine movement and strength of the legs, e.g., strides and the strength of stepping, and naturally, robust walking with two legs is not possible in any unknown environment.

The present invention has been made in view of circumstances as mentioned above, and an objective thereof is to provide a riding-style two-legged walking transportation device capable of robustly walking with two legs even in an unknown environment such as irregular ground.

SUMMARY OF THE INVENTION

To solve the problems mentioned above, a two-legged walking transportation device according to the present invention includes an upper body unit for supporting a rider's trunk, and leg units provided below the upper body unit, each of the leg units includes a link mechanism connected at one end to the upper body unit via a hip joint with at least three degrees of freedom, a foot mechanism connected to the other end of the link mechanism via an ankle joint with at least two degrees of freedom and being contactable with a floor surface, and a fixing mechanism for fixing the rider's foot to the link mechanism via a multi-axis force sensor so as to be only rotatable with respect to directions in which the ankle joint is movable, the hip joint is voluntarily controlled in accordance with operating force and/or operating torque provided by the rider's foot and sensed by the multi-axis force sensor (voluntary leg control), and control of the ankle joint while standing is automatically performed as balance maintenance control without directly involving the rider (auto balance control).

Furthermore, the link mechanism may include a thigh link connected at one end to the upper body unit via the hip joint, and a lower leg link connected at one end to the other end of the thigh link via a knee joint with at least a single degree of freedom and at the other end to the foot mechanism via the ankle joint, and the fixing mechanism may be fixed to the lower leg link, so that the knee joint, along with the hip joint, is voluntarily controlled in accordance with the operating force and/or the operating torque sensed by the multi-axis force sensor.

Furthermore, the fixing mechanism may include a rocking mechanism allowing the rider's foot to be only rotatable with respect to directions in which the ankle joint is movable, and the rocking mechanism is preferably provided either between the rider's foot and the multi-axis force sensor or between the multi-axis force sensor and the link mechanism.

In the present invention, gait generation, which is difficult to realize with a computer, and leg control involved therein are performed by the rider himself/herself through voluntary leg control, so that the difficulty of realizing the gait generation function can be overcome, making it possible to provide a riding-style two-legged walking transportation device capable of walking with two legs even in an unknown environment such as irregular ground.

Moreover, in the present invention, balance maintenance control is automatically performed by auto balance control without directly involving the rider, and therefore it is possible to significantly reduce the rider's burden of a balance maintenance operation, thereby allowing the rider to focus entirely on leg manipulation.

Figure 1:
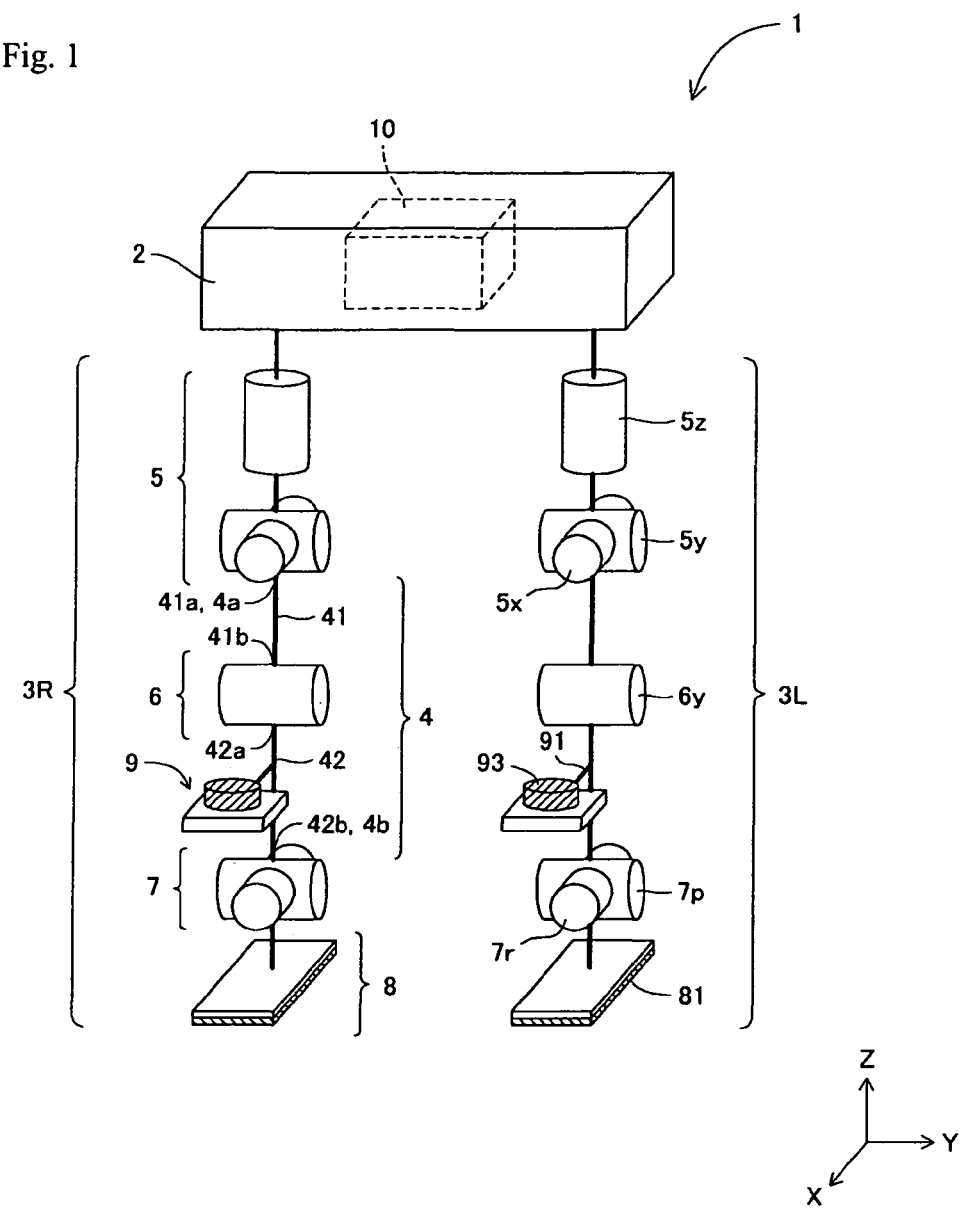
FIG. 1 is a schematic diagram illustrating an exemplary two-legged walking transportation device according to the present invention.

DESCRIPTION OF THE REFERENCE CHARACTERS 1 two-legged walking transportation device
2 upper body unit
3R right leg unit
3L left leg unit
4 link mechanism
41 thigh link
42 lower leg link
5 hip joint
6 knee joint
7 ankle joint
8 foot mechanism
81 ground reaction force sensor
82 base member
83 ground pad
84 rocking mechanism (remote center mechanism)
85 single-axis ground reaction force sensor
86 main body
87 coupling portion
88 tip portion
89 rigid rod
9 fixing mechanism
91 support member
92 rocking mechanism (remote center mechanism)
93 multi-axis force sensor
10 control section
11 voluntary leg control section
12 auto balance control section
13 joint angle sensor

DESCRIPTION OF THE PREFERRED EMBODIMENTS

Hereinafter, referring to FIGS. 1 to 6, a preferred embodiment of a two-legged walking transportation device according to the present invention will be described. Note that in the following description, the X-, Y-, and Z-axis directions refer respectively to the forward/backward direction (the positive direction being forward), rightward/leftward direction (the positive direction is leftward as viewed from the rider), and upward/downward direction (the positive direction being upward) of the two-legged walking transportation device.

[Overall Configuration Of The Two-Legged Walking Transportation Device]

FIG. 1 is a schematic diagram illustrating an example of the two-legged walking transportation device according to the present invention. As shown in this figure, the two-legged walking transportation device 1 includes an upper body unit 2 for supporting and securing the trunk of the rider (preferably, around the waist), and a pair of right and left leg units 3R and 3L provided therebelow.

Each of the leg units 3R and 3L includes a link mechanism 4 connected at one end 4a to the upper body unit 2 via a hip joint 5 with at least three degrees of freedom, and a foot mechanism 8 connected to the other end 4b of the link mechanism 4 via an ankle joint 7 with at least two degrees of freedom. The hip joint 5 includes a rotation axis 5x about the X-axis, a rotation axis 5y about the Y-axis, and a rotation axis 5z about the Z-axis. The ankle joint 7 includes a rotation axis 7r about a roll axis (X-axis), and a rotation axis 7p about a pitch axis (Y-axis).

The link mechanism 4 includes a thigh link 41 connected at one end 41a to the upper body unit via the hip joint 5, and a lower leg link 42 connected at one end 42a to the other end 41b of the thigh link 41 via a knee joint 6 with at least a single degree of freedom and also connected at the other end 42b to the foot mechanism 8 via the ankle joint 7. The knee joint 6 includes a rotation axis 6y about the Y-axis. While it is possible to omit the knee joint 6 and connect the hip joint 5 and the ankle joint 7 by one link mechanism 4, from the viewpoint of achieving smooth two-legged walking, the knee joint 6 is preferably provided as shown in FIG. 1.

The foot mechanism 8 has a ground reaction force sensor 81. As will be described in detail later, the ground reaction force sensor 81 includes a plurality of single-axis ground reaction force sensors (pressure sensors), and is capable of detecting distribution of ground reaction force.

Each of the leg units 3R and 3L further includes a fixing mechanism 9 for fixing the rider's foot so as to be only rotatable with respect to directions in which the ankle joint 7 is movable, i.e., pitch and roll rotations. The fixing mechanism 9 includes a multi-axis (at least four axes) force sensor 93 for detecting voluntary operating force and/or voluntary operating torque from the rider's foot, and a support member 91 for coupling the sensor to the link mechanism 4, and fixes the rider's foot so as to be only rotatable with respect to the pitch and roll rotations of the ankle joint 7. A concrete configuration of the fixing mechanism 9 will be described in detail later.

Each of the rotation axes of the hip joint 5, the knee joint 6, and the ankle joint 7 mainly includes a drive motor rotating about its axis and a joint angle sensor for detecting an angle of joint rotation. The driving of the drive motor is controlled by a control section 10 provided in the upper body unit 2. The joint angle sensor outputs a signal related to the detected angle of joint rotation to the control section 10.

Figure 2:
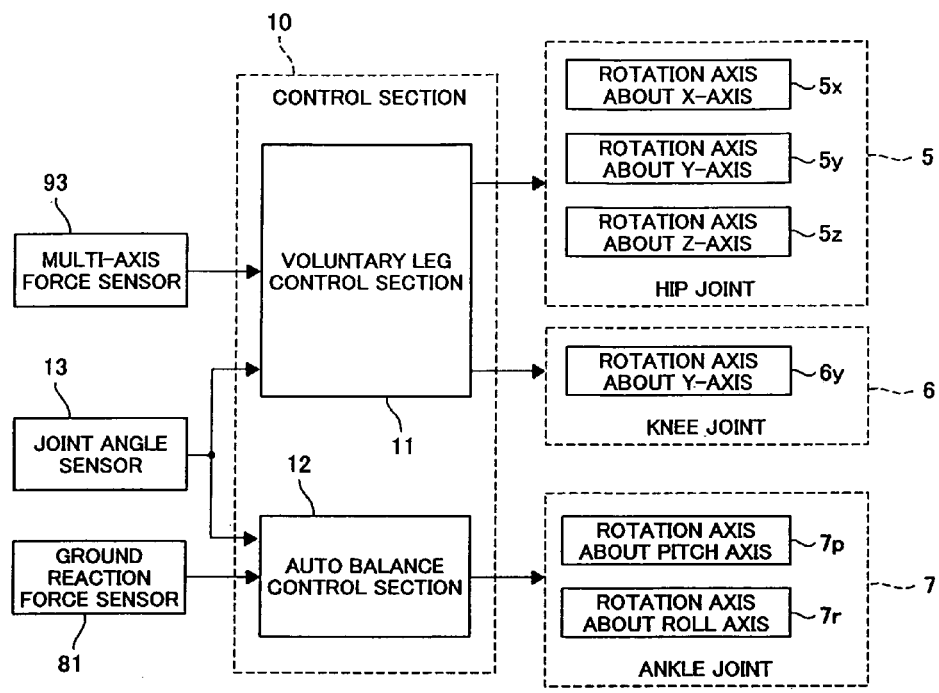
FIG. 2 is a block diagram related to control to be performed in the two-legged walking transportation device according to the present invention.

As shown in FIG. 2, the control section 10 includes a voluntary leg control section 11 and an auto balance control section 12. Of these, the voluntary leg control section 11 controls the driving of the rotation axes of the hip joint 5 and the knee joint 6 in accordance with the voluntary operating force and/or the voluntary operating torque detected from the rider's foot by the multi-axis force sensor 93. For example, when the rider raises his/her right foot, resulting in decreased force to be detected by the multi-axis force sensor 93 of the right leg unit 3R, the voluntary leg control section 11 moves the hip joint 5 and the knee joint 6, thereby raising the right leg unit 3R. Thereafter, when the rider lowers the right foot, resulting in increased force detected by the multi-axis force sensor 93, the voluntary leg control section 11 moves the hip joint 5 and the knee joint 6 in a direction opposite to the previous direction, thereby lowering the right leg unit 3R. In this case, the rider uses the multi-axis force sensor 93 not only simply as an ON/OFF switch, but also to sequentially adjust the magnitude and the direction of the operating force and/or the operating torque, whereby it is possible to perform a fine operation to, for example, lower the right leg unit 3R slightly to the right in accordance with the condition of unknown irregular ground or suchlike.

On the other hand, the auto balance control section 12 controls the driving of the rotation axes of the ankle joint 7 in accordance with the distribution of ground reaction force detected by the ground reaction force sensor 81. For example, in the case of one-foot standing, only on the left leg unit 3L, with the right leg unit 3R raised, if the combined center of gravity (more precisely, zero moment point) of the two-legged walking transportation device 1 and the rider moves forward, the ground reaction force sensor 81 of the left leg unit 3L detects the ground reaction force to be greater on the toe side than on the heel side. Thereafter, the auto balance control section 12 controls the driving of the rotation axis $7p$ about the pitch axis of the ankle joint 7 in accordance with the detected distribution of ground reaction force, thereby tilting the link mechanism 4 backward. As a result, the combined center of gravity moves backward, thereby preventing the falling.

Note that the driving of the rotation axes of the hip joint 5 and the knee joint 6 is controlled only based on the operating force and/or the operating torque detected by the multi-axis force sensor 93 and the joint angle detected by the joint angle sensor 13. Accordingly, the hip joint 5 and the knee joint 6 are not driven against the rider's intentions. In addition, the driving of the rotation axes of the ankle joint 7 is controlled only based on the distribution of ground reaction force detected by the ground reaction force sensor 81 and the joint angle detected by the joint angle sensor 13. Accordingly, even if the rider applies force to the multi-axis force sensor 93, the ankle joint 7 is not driven in response.

As stated above, in the two-legged walking transportation device 1 according to the present invention, leg control (control of the driving of the hip joint 5 and the knee joint 6 by the voluntary leg control section 11), which is performed by sequentially changing the operating force and/or the operating torque applied by the rider to the multi-axis force sensor 93, is independent of balance maintenance control (control of the driving of the ankle joint 7 by the auto balance control section 12), which is automatically performed in accordance with the distribution of ground reaction force, so that they do not interfere with each other. Accordingly, the two-legged walking transportation device 1 according to the present invention allows the rider to perform voluntary leg control without being concerned about balance maintenance control to be automatically performed (auto balance control), making it possible to achieve two-legged walking even in an unknown environment such as irregular ground. Moreover, in the present invention, auto balance control is automatically performed without direct relation to the rider's operation, and voluntary leg control by the rider does not interfere with auto balance control, so that the rider can focus entirely on voluntary leg control to sequentially generate gaits.

[Configuration Of The Fixing Mechanism]

Next, referring to FIGS. 3 and 4, a concrete configuration of the fixing mechanism 9 will be described. As described earlier, the fixing mechanism 9 is provided to the link mechanism 4 of each of the leg units 3R and 3L, and selectively fixes the rider's foot so as to be rotatable only with respect to the pitch and roll rotations of the ankle joint 7.

Figure 3:
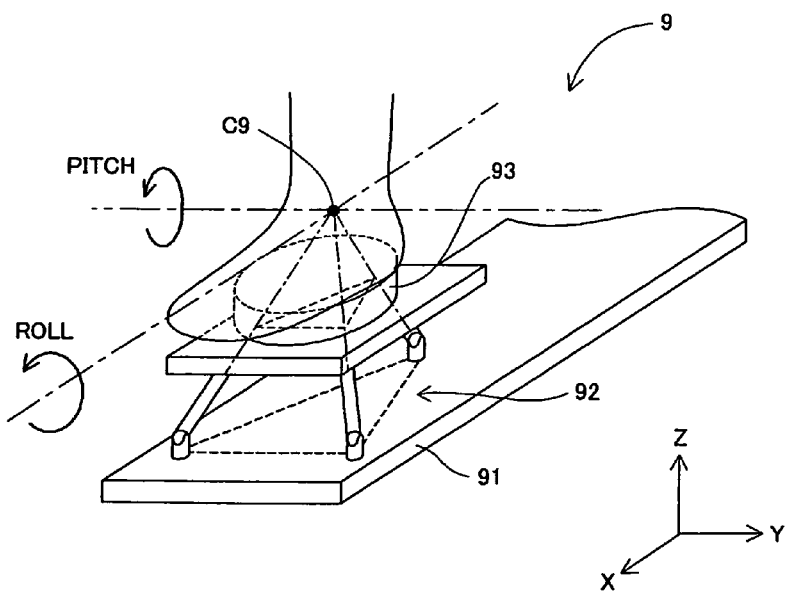
FIG. 3 is a perspective view of a fixing mechanism provided in the two-legged walking transportation device according to the present invention.

As shown in FIG. 3, the fixing mechanism 9 includes the support member 91, the rocking mechanism 92, and the multi-axis force sensor 93. First of all, the support member 91 is a rigid member for coupling the link mechanism 4 to the rocking mechanism 92 and the multi-axis force sensor 93. The shape of the support member 91 is not limited to a plate-like shape as shown in FIG. 3, and it is possible to employ any arbitrary shape capable of arranging the rocking mechanism 92 and the multi-axis force sensor 93 on its end section.

The multi-axis force sensor 93 is at least a four-axis force sensor, which converts operating force and/or operating torque from the rider's foot into an appropriate electric signal, and outputs the signal to the voluntary leg control section 11 of the control section 10. In addition, the multi-axis force sensor 93 has provided thereon a member for preventing displacement of the rider's foot. Applicable examples of such a member include slippers and shoes capable of accommodating the rider's foot and belts for tying and fixing the foot. Moreover, a protection mechanism for quickly releasing the rider's foot in the case of emergency is preferably provided as the member for preventing displacement of the foot.

The rocking mechanism 92 is a mechanism for allowing roll and pitch rotations of the multi-axis force sensor 93, and includes three rigid rods each having universal joints with two degrees of freedom provided at opposite ends. Since this mechanism is disposed between the rider's foot and the link mechanism 4, any roll/pitch rotation of the rider's foot does not affect the link mechanism 4 at all. Moreover, because of auto balance control, any roll/pitch rotation of the ankle joint 7 does not apply excessive force to the rider's foot. On the other hand, the rocking mechanism 92 fixes the rider's foot to the link mechanism 4 with respect to translations in the X, Y, and Z directions and the direction of yaw rotation. Accordingly, when leg control causes the link mechanism 4 to move in the X, Y, or Z direction or the yaw direction, the movement is mechanically transmitted to the rider's foot in a direct manner.

Furthermore, the rocking mechanism 92 uses a known remote center mechanism and therefore can have a rocking center C9 for the roll/pitch rotation at an appropriate position on the rider's sole or in the foot (e.g., the ankle). Thus, it is possible to reduce the risk of the rider's ankle being sprained.

Figure 4:
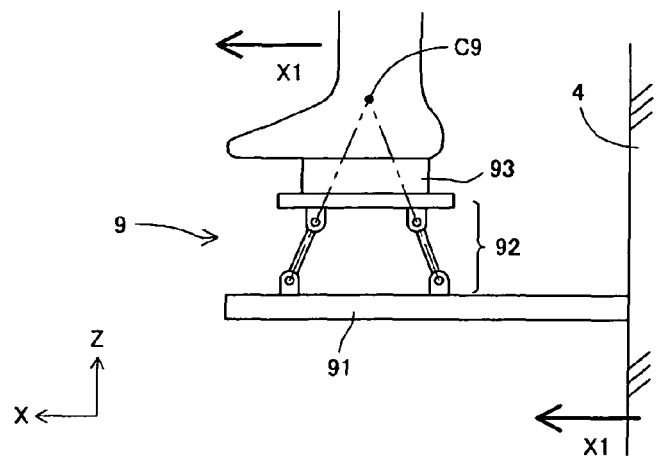
FIG. 4 provides two-dimensional schematic views describing the motion of the fixing mechanism shown in FIG. 3, where (A) an ankle joint is neither in pitch rotation nor in roll rotation, and (B) the ankle joint is in pitch rotation.
Figure 4B:
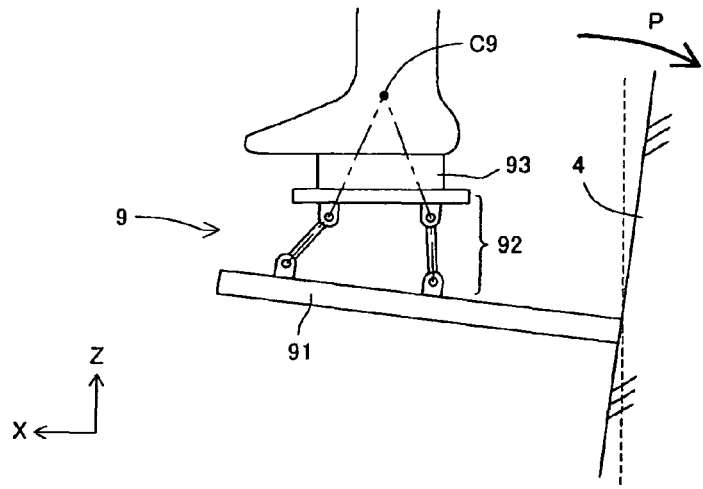

FIG. 4 illustrates a concrete motion of the rocking mechanism 92. When the link mechanism 4 moves by X1 in the X direction as shown in FIG. 4(A), the multi-axis force sensor 93 and the rider's foot on the rocking mechanism 92, which are mechanically connected thereto, naturally move by X1 in the X direction. Likewise, when the link mechanism 4 moves in the Y direction, the Z direction, and the yaw direction, the multi-axis force sensor 93 and the rider's foot also move simultaneously with the link mechanism 4. On the other hand, even when the link mechanism 4 is tilted backward, as shown in FIG. 4(B), due to the driving of the rotation axis $7p$ about the pitch axis of the ankle joint 7 being controlled, the multi-axis force sensor 93 and the rider's foot on the rocking mechanism 92 do not always move simultaneously with the link mechanism 4. In the case where the driving of the rotation axis 7r about the roll axis is controlled also, they do not always move simultaneously. That is, despite auto balance control being performed without involving the rider, such control does not apply excessive force to the rider's foot.

[Configuration Of The Foot Mechanism]

Next, referring to FIGS. 5 and 6, a concrete configuration of the foot mechanism 8 will be described. As the foot mechanism 8, a conventional foot mechanism invented by the present inventor can be applied without modification (see PCT/JP2008/057247).

Figure 5:
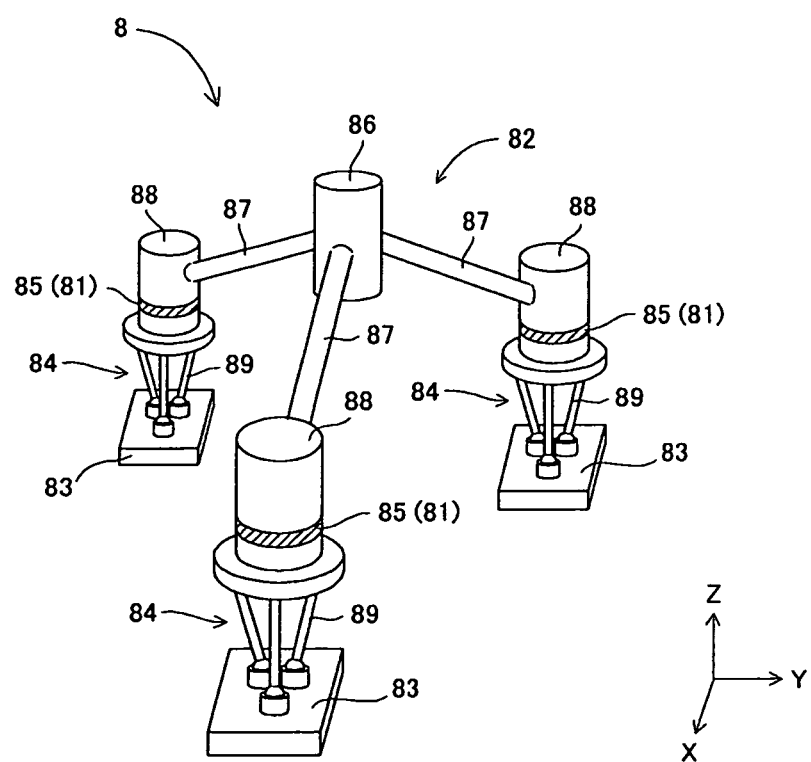
FIG. 5 is a perspective view of a substantial part of a foot mechanism provided in the two-legged walking transportation device according to the present invention.

As shown in FIG. 5, the foot mechanism 8 includes a base member 82 connected to the bottom of the ankle joint 7, three ground pads 83 each having a flat tread, and rocking mechanisms 84 allowing the ground pads 83 to be pivotably coupled to the base member 82. First of all, the base member 82 includes a main body 86 connected to the ankle joint 7, three coupling portions 87 extending in three directions from the main body 86, and tip portions 88 provided at their tips. In addition, the coupling portions 87 extend in downward directions different from one another.

Each of the tip portions 88 has sandwiched therein a single-axis ground reaction force sensor 85 (corresponding to the ground reaction force sensor 81 in FIG. 1). The single-axis ground reaction force sensor 85 detects a component of the ground reaction force applied to the ground pad 83 that corresponds to the height direction of the tip portion 88. The single-axis ground reaction force sensor 85 then converts that component of the force into an appropriate electric signal and outputs the signal to the auto balance control section 12 in the control section 10.

Each of the rocking mechanisms 84 includes three rigid rods 89. As shown in FIG. 5, each of the rigid rods 89 has ball joints with three degrees of freedom provided at opposite ends. In addition, each of the rigid rods 89 is connected to the ground pad 83 and the tip portion 88 via the ball joints. Note that the ball joints can be replaced by universal joints with two degrees of freedom.

Figure 6A:
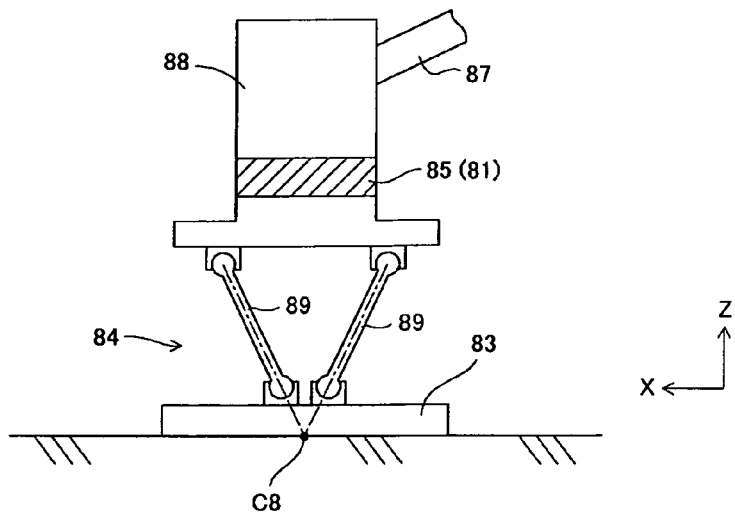
FIG. 6 provides two-dimensional schematic views describing the motion of the foot mechanism shown in FIG. 5, where (A) the mechanism is in contact with a flat floor surface, and (B) the mechanism is on a stepped surface.
Figure 6B:
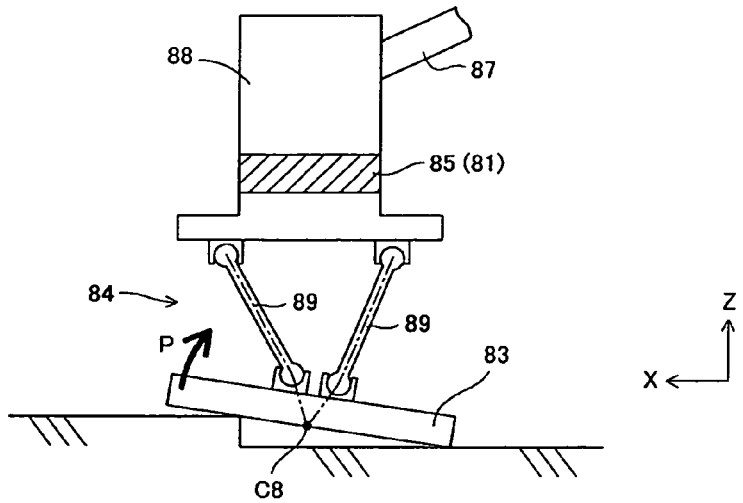
Figure 7A:
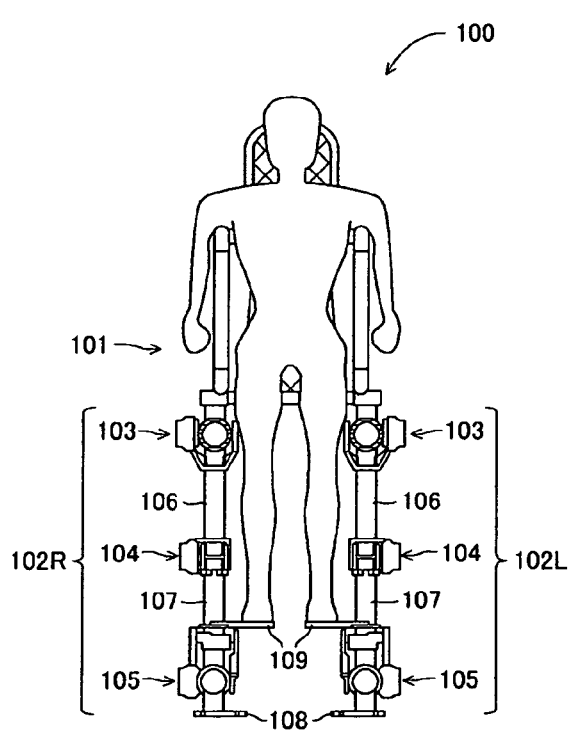
FIG. 7 provides (A) a front view and (B) a side view illustrating an exemplary conventional two-legged walking transportation device.
Figure 7B:
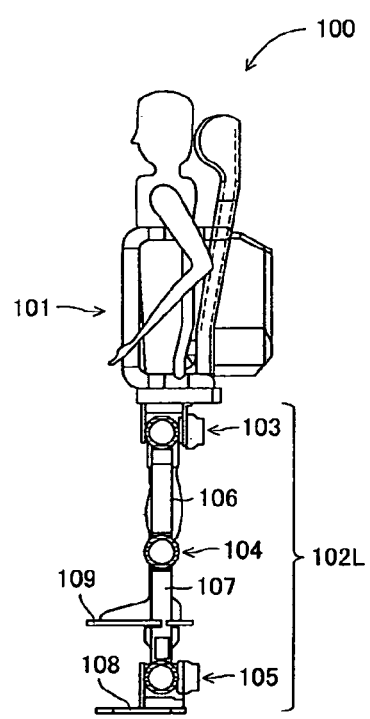

FIG. 6 concretely illustrates the motion of the rocking mechanism 84. As shown in FIG. 6 (B), the ground pad 83 is inclined when moving on a stepped surface of the floor. However, the rocking mechanism 84 forms a known remote center mechanism, and therefore the ground pad 83 is rotatable about a rocking center (remote center) C8 determined by the positional relationship between the rigid rods. The rocking center C8 can be considered as a grounding point which is fixed with respect to the base member 82. Accordingly, the foot mechanism 8 is substantially equivalent to a foot mechanism with a fixed three-point support structure (see PCT/JP2008/055737). Thus, even on irregular ground, it is possible to exhibit high ground contact properties and generate torque without wobbling with respect to the surface of the irregular ground.

As described above, the two-legged walking transportation device according to the present invention additionally includes the foot mechanism 8, and therefore can perform two-legged walking without losing balance even on such irregular ground that cannot be handled simply with auto balance control for controlling the driving of the ankle joint 7.

While a preferred embodiment of the two-legged walking transportation device according to the present invention has been described above, the present invention is not limited to configurations as mentioned above.

For example, while the fixing mechanism 9 shown in FIG. 3 has the rocking mechanism 92 disposed on the support member 91 and the multi-axis force sensor 93 disposed further thereon, the rocking mechanism 92 may be disposed on the multi-axis force sensor 93. In addition, the foot mechanism 8 shown in FIG. 5 is not restrictive, and any other foot mechanism capable of absorbing differences in level on the floor surface may be employed.

Furthermore, the rocking mechanism 92 is not limited to the mechanism including three rigid rods, and any mechanism can be employed so long as the rider's foot is rotatable in the roll and pitch directions while being fixed in the X, Y, and Z directions and the yaw direction. In such a case also, it is preferable to form a remote center mechanism having a rocking center C9 at an appropriate position on the rider's sole or in the foot (e.g., the ankle).

Furthermore, while the rocking mechanism 92 allows the rider's foot to be rotatable in the roll and pitch directions, it does not have to be a completely free joint, and by providing, for example, an additional spring/damper mechanism, it is possible to add the function of returning to a reference position upon rotation in the roll/pitch direction or the function of relaxing impact.

The invention claimed is:

1. A two-legged walking transportation device comprising:
an upper body unit for supporting a rider's trunk; and
leg units provided below the upper body unit, wherein each of the leg units includes:
a link mechanism connected at one end to the upper body unit via a hip joint with at least three degrees of freedom;
a foot mechanism connected to the other end of the link mechanism via an ankle joint with at least two degrees of freedom and being contactable with a floor surface; and
a fixing mechanism for fixing the rider's foot to the link mechanism via a multi-axis force sensor,
wherein the fixing mechanism is connected to the link mechanism above the ankle joint, the hip joint is voluntarily controlled in accordance with operating force and/or operating torque provided by the rider's foot and sensed by the multi-axis force sensor, and control of the ankle joint while standing is automatically performed as balance maintenance control without directly involving the rider.

2. The two-legged walking transportation device according to claim 1, wherein the link mechanism includes:
a thigh link connected at one end to the upper body unit via the hip joint; and
a lower leg link connected at one end to the other end of the thigh link via a knee joint with at least a single degree of freedom and at the other end to the foot mechanism via the ankle joint,
wherein the fixing mechanism is fixed to the lower leg link, the knee joint, along with the hip joint, is voluntarily controlled in accordance with the operating force and/or the operating torque sensed by the multi-axis force sensor.

3. A two-legged walking transportation device comprising:
an upper body unit for supporting a rider's trunk; and
leg units provided below the upper body unit, wherein each of the leg units includes:
a link mechanism connected at one end to the upper body unit via a hip joint with at least three degrees of freedom;
a foot mechanism connected to the other end of the link mechanism via an ankle joint with at least two degrees of freedom and being contactable with a floor surface; and
a fixing mechanism for fixing the rider's foot to the link mechanism via a multi-axis force sensor, the hip joint is voluntarily controlled in accordance with operating force and/or operating torque provided by the rider's foot and sensed by the multi-axis force sensor, and control of the ankle joint while standing is automatically performed as balance maintenance control without directly involving the rider; and wherein the fixing mechanism includes a rocking mechanism allowing the rider's foot to be only rotatable with respect to directions in which the ankle joint is movable, and the rocking mechanism is provided either between the rider's foot and the multi-axis force sensor or between the multi-axis force sensor and the link mechanism.

4. The two-legged walking transportation device of claim 3, wherein the fixing mechanism is connected to the link mechanism above the ankle joint.

* * * * *